June 27, 1944.     J. BOLSEY     2,352,181

CAMERA WITH REMOVABLE FILM MAGAZINE

Original Filed June 27, 1941

INVENTOR:
Jacques Bolsey
BY
his agent

Patented June 27, 1944

2,352,181

UNITED STATES PATENT OFFICE 2,352,181

CAMERA WITH REMOVABLE FILM MAGAZINE

Jacques Bolsey, New York, N. Y.

Original application June 27, 1941, Serial No. 400,047, now Patent No. 2,319,530, dated May 18, 1943. Divided and this application May 15, 1943, Serial No. 487,120

6 Claims. (Cl. 88—17)

This application is a division of U. S. patent application Serial No. 400,047, "Film magazines," filed June 27, 1941.

My invention relates to improvements in motion picture cameras and more particularly to cameras provided with removable film magazines.

It is an object of my present invention to provide a new combination of a stationary aperture gate with a spring gate by which the film is securely guided at the required distance from the objective lens.

It is a further object of my present invention to provide means enabling proper guiding of the film along the exposure opening within the film magazine.

It is another object of my present invention to prevent light from reaching the film when the casing of the camera is opened and the film magazine removed therefrom.

With the above objects in view my present invention mainly consists of the combination of a camera casing with a removable film magazine having a front wall provided with an exposure opening, and means for guiding the film inside this magazine along this exposure opening; as proposed by me the camera casing is provided with a stationary aperture plate arranged adjacent to the front wall of the magazine when the same is positioned in the camera casing in picture taking position; in accordance with my present invention this aperture plate is constructed and arranged in such a manner as to reach through the exposure opening of the film magazine into the same when it is positioned in the camera casing in operative picture taking position. Thus the film moving inside the film magazine past the exposure opening is permanently in contact with that part of the stationary aperture plate which is reaching into the film magazine and guided by this stationary projecting part of the plate at a certain constant distance from the objective lens.

Various embodiments of an aperture plate of the above described type are possible. Thus, for instance, a partition wall within the camera casing might serve as an aperture plate; this partition wall has to be provided with an aperture opening corresponding with the exposure opening of the film magazine and a rim projecting into the magazine has to be arranged around this aperture opening, as described below in detail.

It is also possible to combine with an arrangement of the above described type means for closing the exposure opening of the film magazine whenever required. It should be noted that although I have shown in the attached drawing and described in the following description only shutter means which have to be moved by hand it is possible to provide automatically operating shutter means. Such shutter means would automatically close the exposure opening when the camera casing is opened and open this exposure opening when the camera casing is closed. Shutter means which are adapted for these purposes are described in my U. S. Patent No. 2,319,530, "Film magazine," issued May 18, 1943.

The novel features which I consider as characteristic for my invention are set forth in particular in the appended claims. The invention itself, however, both as to its construction and its method of operation, together with additional objects and advantages thereof will be best understood from the following description of specific embodiments, when read in connection with the accompanying drawing, in which:

Figure 1:
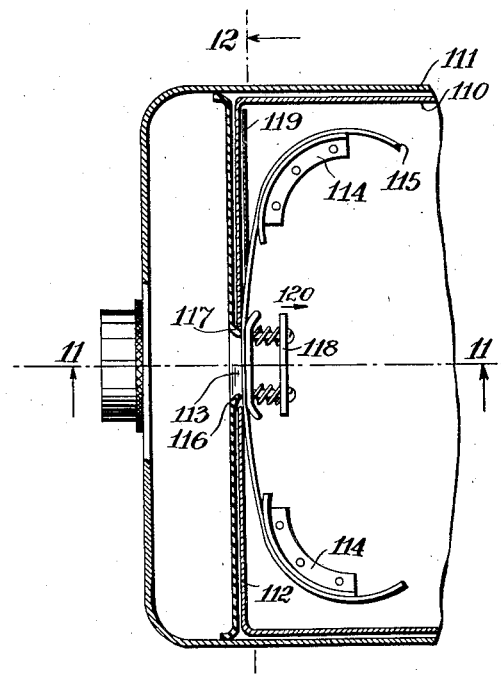
Figure 1 shows a cross-section of a film magazine along line 10—10 of Fig. 2.
Figure 3:
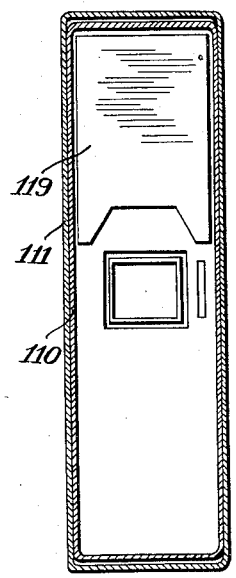
Figure 3 shows a cross-section of the camera casing along line 12—12 of Fig. 1.
Figure 2:
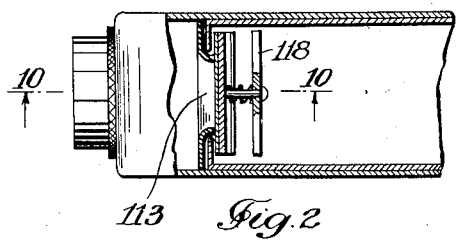
Figure 2 shows a cross-section of the film magazine shown in Fig. 1 along line 11—11 of Fig. 1.

As shown in the drawing, the film magazine 110 is arranged within the camera casing 111. The film magazine 110 comprises a front wall 112 provided with an exposure opening 113; furthermore, means, e. g. guiding plates 114, are provided for guiding the film 115 inside magazine 110 along the exposure opening 113 in the magazine front wall 112. In accordance with my present invention a partition wall serving as stationary film gate e. g. aperture plate 116 is arranged in the camera casing 111 in such a manner that its projecting part, namely the projecting rim 117 arranged around the aperture opening in plate 116 reaches through the exposure opening 113 in the magazine front wall 112 into magazine 110 when the same is positioned in the camera casing 111 in picture taking position. Within the film magazine 110, a spring gate, e. g. a slidable pressure plate 118, is arranged in such a manner as to be adapted to press the film 115 while it passes past the exposure opening 113 in front wall 112 against the projecting part i. e. rim 117 of the stationary aperture plate 116.

In accordance with a preferred embodiment of my present invention, I provide within the magazine 110 shutter-like means, e. g., a shutter plate 119 arranged slidably adjacent to the inner face of the front wall 112; this shutter plate is adapted to be moved between the film 115 and the exposure opening 113 in front wall 112, thereby closing the latter and preventing light to reach the film through the exposure opening when the camera casing 111 is opened and the magazine 110 removed therefrom.

Preferably, the shutter-like means consist of a shutter plate which is adapted to be moved to and fro from the outside of said camera casing, thereby enabling closing of the exposure opening without opening the camera casing.

In a preferred embodiment of my invention, the shutter plate is arranged in such a manner that it presses during its sliding movement the pressure plate 118 backwards in direction of arrow 120; thereby the pressure plate 118 is moved away from the projecting parts 117 of the stationary aperture plate 116 and the shutter plate 119 slides into the thus formed space between pressure and aperture plates.

It will be understood that each of the elements described above, or two or more together, may also find a useful application in other types of film cameras differing from the types described above.

While I have illustrated and described the invention as embodied in film cameras, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and therefore such adaptations should and are intended to be comprehended within the meaning and range of equivalence of the following claims.

What I claim as new and desire to secure by Letters Patent is:

1. In a film camera in combination a camera casing, a removable film magazine having a front wall provided with an exposure opening, means for guiding the film inside of said magazine along said exposure opening, a stationary aperture plate in said camera casing arranged adjacent to said front wall of said magazine when the same is positioned in said camera casing in picture taking position, said aperture plate constructed and arranged in such a manner as to reach through said exposure opening of said film magazine into the same when said magazine is positioned in said camera casing in operative picture taking position, a slidable pressure plate arranged within said film magazine and adapted to press the film while it passes within said film magazine past said exposure opening against said stationary aperture plate reaching into said film magazine, and shutter means arranged within said removable film magazine slidably adjacent to the inner face of said magazine front wall and adapted to be moved between the film and said exposure opening of said film magazine, said shutter means being constructed so as to slide said slidable pressure plate inward against the direction of pressure of said pressure plate during sliding of said shutter means from inoperative into operative position, thereby moving also said film out of contact with said stationary aperture plate in said camera casing and enabling sliding of said shutter means between said film and said aperture plate, thus closing said exposure opening of said film magazine and preventing light from reaching the film through said exposure opening when said camera casing is opened and said magazine removed therefrom.

2. In a film camera in combination a camera casing, a removable film magazine having a front wall provided with an exposure opening, means for guiding the film inside of said magazine along said exposure opening, a stationary aperture plate in said camera casing arranged adjacent to said front wall of said removable film magazine when the same is positioned in said camera casing in picture taking position, said aperture plate being provided with a projecting rim around the aperture opening within said aperture plate, said projecting rim constructed and arranged in such a manner as to reach through said exposure opening of said film magazine into the same when said magazine is in operative picture taking position within said camera casing, a slidable pressure plate arranged within said film magazine and adapted to press the film while it passes within said film magazine past said exposure opening against said projecting rim reaching into said film magazine, and shutter means arranged within said removable film magazine slidably adjacent to the inner face of said magazine front wall and adapted to be moved between the film and said exposure opening said film magazine, said shutter means being constructed so as to slide said slidable pressure plate inward against the direction of pressure of said pressure plate during sliding of said shutter means from inoperative into operative position, thereby moving also said film out of contact with said projecting rim of said stationary aperture plate in said camera casing and enabling moving of said shutter means between said film and said projecting rim of said aperture plate, thus closing said exposure opening of said film magazine and preventing light from reaching the film through said exposure opening when said camera casing is opened and said magazine removed therefrom.

3. In a film camera in combination a camera casing, a removable film magazine having a front wall provided with an exposure opening, means for guiding the film inside of said magazine along said exposure opening, a stationary partition wall in said camera casing arranged adjacent to said front wall of said film magazine when the same is positioned in said camera casing in picture taking position, an aperture opening in said partition wall corresponding to said exposure opening in said magazine front wall when said magazine is in operative picture taking position in said camera casing, a projecting aperture rim on said partition wall around said aperture opening constructed and arranged in such a manner as to reach through said exposure opening of said film magazine into the same when said magazine is in operative picture taking position within said camera casing, a slidable pressure plate arranged within said film magazine and adapted to press the film while it passes within said film magazine past said exposure opening against said projecting rim reaching into said film magazine, and shutter means arranged within said removable film magazine slidably adjacent to the inner face of said magazine front wall and adapted to be moved between the film and said exposure opening of said film magazine, said shutter means being constructed so as to slide said slidable pressure plate inward against the direction of pressure of said pressure plate during sliding of said shutter means from inoperative into operative position, thereby moving also said film out of contact with said projecting rim on said partition wall in said camera casing and enabling moving of said shutter means between said film and said projecting rim of said aperture plate, thus closing said exposure opening of said film magazine and preventing light from reaching the film through said exposure opening when said camera casing is opened and said magazine removed therefrom.

4. In a film camera in combination a camera casing, a removable film magazine having a front wall provided with an exposure opening, means for guiding the film inside of said magazine along said exposure opening, a stationary aperture plate in said camera casing arranged adjacent to said front wall of said magazine when the same is positioned in said camera casing in picture taking position, said aperture plate constructed and arranged in such a manner as to reach through said exposure opening of said film magazine into the same when said magazine is positioned in said camera casing in operative picture taking position, a slidable pressure plate arranged within said film magazine and adapted to press the film while it passes within said film magazine past said exposure opening against said stationary aperture plate reaching into said film magazine, a shutter plate arranged within said removable film magazine slidably adjacent to the inner face of said magazine front wall and adapted to be moved between the film and said exposure opening in said magazine front wall, said shutter plate being constructed so as to slide said slidable pressure plate inward against the direction of pressure of said pressure plate during sliding of said shutter plate from inoperative into operative position, thereby moving also said film out of contact with said stationary aperture plate in said camera casing and enabling sliding of said shutter plate between said film and said aperture plate, and operating means for moving said shutter plate between the film and said exposure opening from the outside of said camera casing, thereby enabling closing of said exposure opening before opening of said camera casing, thus preventing light from reaching said film moving past said exposure opening when said camera casing is opened and said film magazine removed from said casing.

5. In a film camera in combination a camera casing, a removable film magazine having a front wall provided with an exposure opening, means for guiding the film inside of said magazine along said exposure opening, a stationary aperture plate in said camera casing arranged adjacent to said front wall of said removable film magazine when the same is positioned in said camera casing in picture taking position, said aperture plate being provided with a projecting rim around the aperture opening within said aperture plate, said projecting rim constructed and arranged in such a manner as to reach through said exposure opening of said film magazine into the same when said magazine is in operative picture taking position within said camera casing, a slidable pressure plate arranged within said film magazine and adapted to press the film while it passes within said film magazine past said exposure opening against said projecting rim reaching into said film magazine, a shutter plate arranged within said removable film magazine slidably adjacent to the inner face of said magazine front wall and adapted to be moved between the film and said exposure opening in said magazine front wall, said shutter plate being constructed so as to slide said slidable pressure plate inward against the direction of pressure of said pressure plate during sliding of said shutter plate from inoperative into operative position, thereby moving also said film out of contact with said projecting rim of said stationary aperture plate in said camera casing and enabling moving of said shutter plate between said film and said aperture plate, and operating means for moving said shutter plate between the film and said exposure opening from the outside of said camera casing, thereby enabling closing of said exposure opening before opening of said camera casing, thus preventing light from reaching said film moving past said exposure opening when said camera casing is opened and said film magazine removed from said casing.

6. In a film camera in combination a camera casing, a removable film magazine having a front wall provided with an exposure opening, means for guiding the film inside of said magazine along said exposure opening, a stationary partition wall in said camera casing arranged adjacent to said front wall of said film magazine when the same is positioned in said camera casing in picture taking position, an aperture opening in said partition wall corresponding to said exposure opening in said magazine front wall when said magazine is in operative picture taking position in said camera casing, a projecting aperture rim on said partition wall around said aperture opening constructed and arranged in such a manner as to reach through said exposure opening of said film magazine into the same when said magazine is in operative picture taking position within said camera casing, a slidable pressure plate arranged within said film magazine and adapted to press the film while it passes within said film magazine past said exposure opening against said projecting rim reaching into said film magazine, a shutter plate arranged within said removable film magazine slidably adjacent to the inner face of said magazine front wall and adapted to be moved between the film and said exposure opening in said magazine front wall, said shutter plate being constructed so as to slide said slidable pressure plate inward against the direction of pressure of said pressure plate during sliding of said shutter plate from inoperative into operative position, thereby moving also said film out of contact with said projecting rim on said partition wall, and operating means for moving said shutter plate between the film and said exposure opening from the outside of said camera casing, thereby enabling closing of said exposure opening before opening of said camera casing, thus preventing light from reaching said film moving past said exposure opening when said camera casing is opened and said film magazine removed from said casing.

JACQUES BOLSEY.